Figure 1:
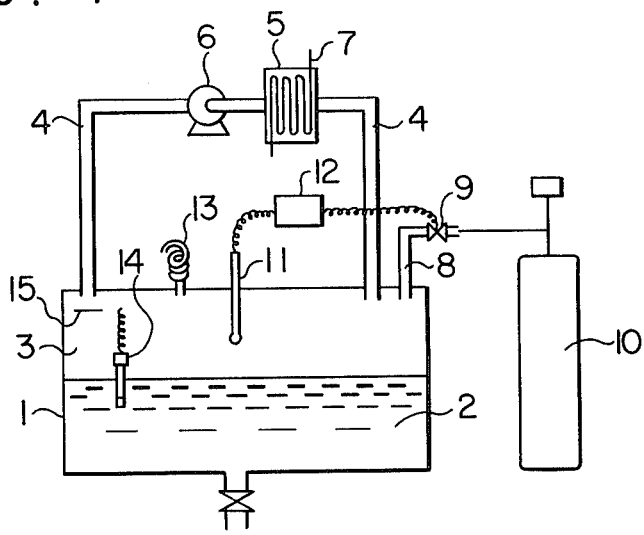

United States Patent [19]

Okuhara et al.

[11] Patent Number: 4,463,019

[45] Date of Patent: Jul. 31, 1984

[54] STATIONARY PROCESS FOR PRODUCING VINEGAR

[75] Inventors: Akira Okuhara, Kashiwa; Yasuyosi Kotaka; Masakazu Nishio, both of Noda; Susumu Sato, Tsuchiura; Isamu Watanabe; Masaru Inoue, both of Noda, all of Japan

[73] Assignee: Kikkoman Corporation, Noda, Japan

[21] Appl. No.: 270,863

[22] Filed: Jun. 5, 1981

[30] Foreign Application Priority Data

Jun. 11, 1980 [JP] Japan .................................. 55-77723

[51] Int. Cl.$^3$ ............................ C12J 1/00; C12P 7/54
[52] U.S. Cl. ..................................... 426/17; 426/312; 426/474; 435/140; 435/818
[58] Field of Search ....................... 426/17, 312, 474; 435/140, 818; 422/234

[56] References Cited

U.S. PATENT DOCUMENTS

| 61,978 | 2/1967 | Witbeck | 426/17 |
| 1,732,921 | 10/1929 | Bratton | 426/17 |
| 2,423,897 | 7/1947 | Mackin | 426/17 |
| 3,014,804 | 12/1961 | Els et al. | 435/140 |
| 4,233,266 | 11/1980 | Kummer | 422/234 |

FOREIGN PATENT DOCUMENTS

| 2755528 | 6/1978 | Fed. Rep. of Germany | 426/17 |
| 49-66898 | 6/1974 | Japan | 426/17 |

Primary Examiner—Raymond N. Jones
Assistant Examiner—Elizabeth J. Curtin
Attorney, Agent, or Firm—Banner, Birch, McKie & Beckett

[57] ABSTRACT

A process for producing vinegar by stationary acetic acid fermentation which comprises charging the starting mash into a closed type fermentation tank, keeping the oxygen concentration in the gas phase of said fermentation tank so as to fall in a range of 20-60% (V/V), and controlling the fermentation temperature by circulating the gas phase part in said tank outside the tank and controlling its temperature there.

4 Claims, 3 Drawing Figures

STATIONARY PROCESS FOR PRODUCING VINEGAR

This invention relates to a process for producing vinegar by the stationary acetic acid fermentation, and to a system therefor. More particularly, the invention relates to a process for producing vinegar by using a closed type of fermentation tank, supplying oxygen into the upper space of the tank to keep the oxygen concentration of the gas phase at a predetermined value and carrying out a stationary culture, and to a system for practicing said process.

As a process for producing vinegar, a variety of processes are hitherto known, one of which is stationary acetic acid fermentation. As compared with other processes, this process has a merit in that the brewed vinegar obtained is superior in quality and the production can be practised with a very simple apparatus. However, the fault of this process consists in that the production takes a long period of time (one month or more), the starting ingredients, i.e. alcohol, acetic acid and water, are lost in the course of production by vaporization so that the yield of product vinegar or the utilization rate of the starting material is low, the vapors of alcohol and acetic acid remarkably injure the working environments upon staying in the room and cause the problem of public hazard such as corrosion of metals on the neighboring structures when released out of the room, and the mash is easily polluted in the course of production by organisms such as various bacteria, insects and the like which is insanitary and troublesome. In order to reduce such pollution and to prevent the mash from rotting, there are various counter-measures for elevating the initial acidity (acetic acid concentration at the time of charge) of mash such as adjusting the initial acidity to 2% and the final acidity to a little over 4%, adjusting the initial acidity to 3% and the final acidity to a little over 6%, etc. By such a technique, however, about one half of the produced vinegar is again recycled into charge. In addition, a higher acidity of mash gives a lower velocity of acetic acid production by acetic acid bacteria, so that the quantity of vinegar produced per unit volume of fermentation tank is very small.

In view of the above, the present inventors conducted earnest studies with the aim of overcoming the above-mentioned fault in the production of vinegar by stationary acetic acid fermentation. As the result, it was found that, in the production of vinegar by the acetic acid fermentation, a vinegar excellent in quality can be produced in a very short period of time, in a high yield, under scarce influence of miscellaneous bacteria and in a good working environment by charging the starting mash into a closed type of fermentation tank, inoculating it with acetic acid bacteria, supplying oxygen into the upper space (hereinafter, it is referred to as "gas phase") of the tank and carrying out stationary culture while keeping the oxygen concentration of the gas phase in a suitable range.

In the course of acetic acid fermentation, a very large quantity of fermentation heat is generated in the mash of the liquid phase as fermentation progresses, and an effective removal of this fermentation heat is quite important. Although there is hitherto known a process in which the temperature of mash is controlled by letting cold or hot water flow down on the outer wall of the fermentation tank to cool or warm the outer wall, an effective control of temperature is difficult by this process. Further, there is known the so-called internal heat exchange type of fermentation tank which has a spiral heat exchanger in the liquid phase in a fermentation tank. However, it is disadvantageous in that the neighborhood of liquid surface is not cooled effectively, the tank is complicated in structure, the repairs at the time of failure and the cleaning are difficult to do, and the apparatus cost is very high.

As the result of various studies, the present inventors found that, in the stationary acetic acid fermentation, the fermentation heat is not generated in the whole mash as fermentation progresses, but a very large quantity of fermentation heat is generated only in the surface layer part of the mash and that. Even when the mash has so low a temperature as that it be heated require to up to the optimum temperature for the growth of acetic acid bacteria, heating the whole mash is unnecessary and heating only the surface layer part of mash is enough. As the result of additional studies, it was found that an effective removal of heat from only the surface layer part of mash or an effective heating of it can be done by sending the gas in the gas phase of the closed type fermentation tank of this invention to an external heat exchanging apparatus to remove heat therefrom or to give heat thereto and again circulating the gas into inside of the tank and that, as a result, fermentation of mash can be completed in a very short period of time without injuring the product quality at all. This invention was accomplished on the basis of these findings.

Figure 2:
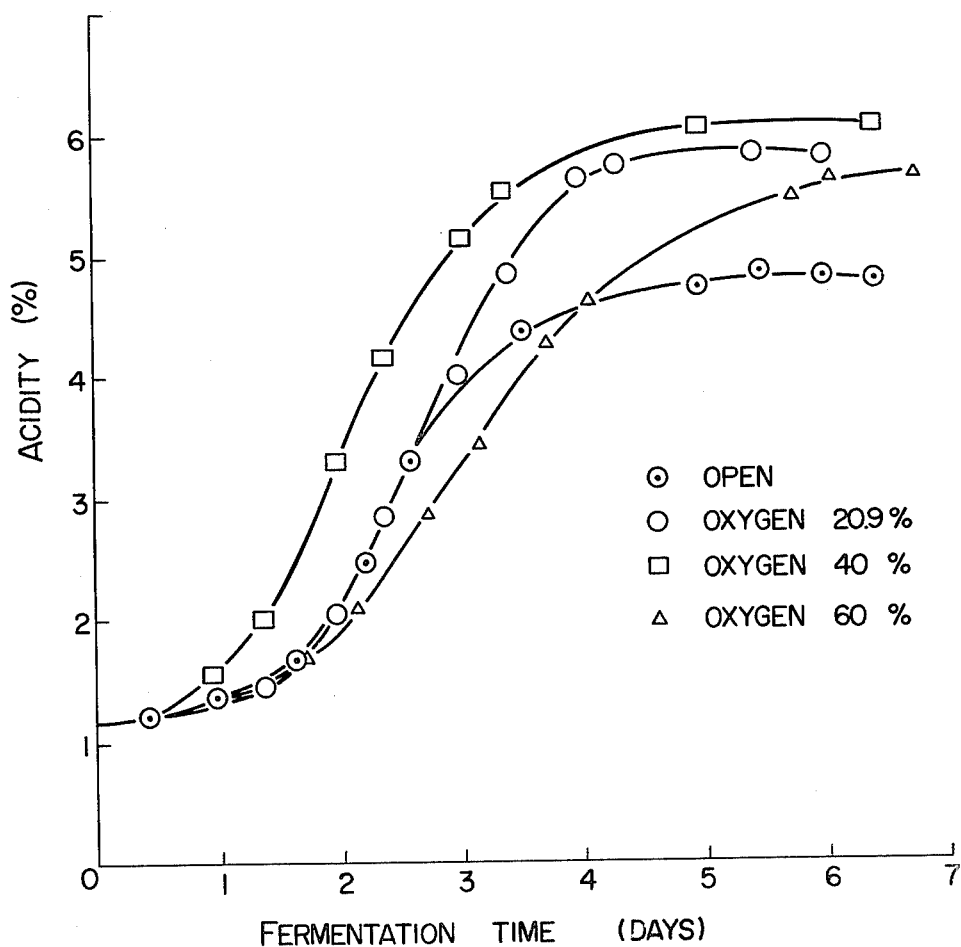
Figure 3:
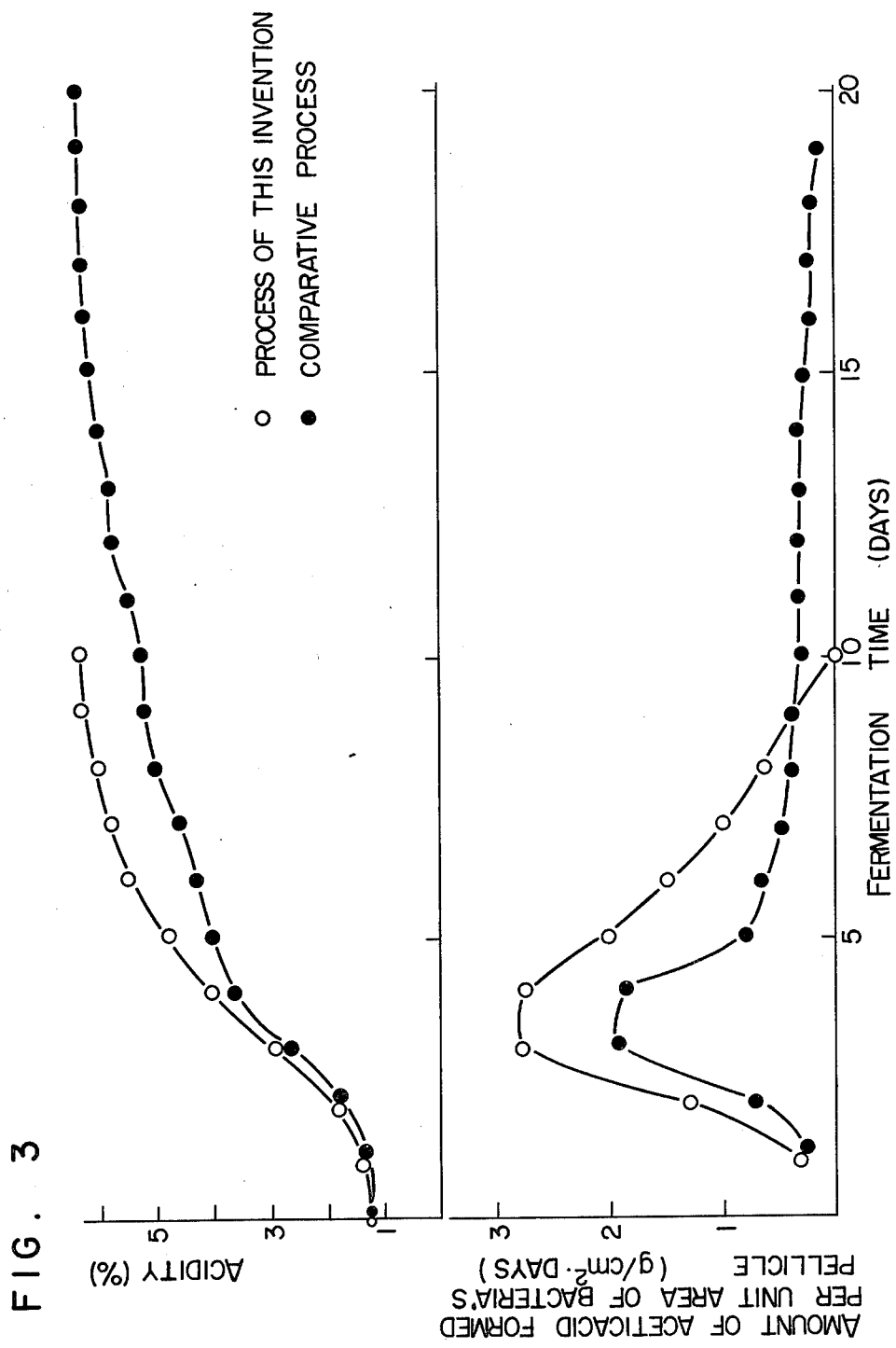

In the drawings attached,

FIG. 1 is an outlined view illustrating one concrete example of the production system of vinegar of this invention; and FIGS. 2 and 3 are graphs in which the process for producing vinegar according to this invention is compared with a prior process (comparative process) for producing vinegar in the day-by-day change of acidity in the acetic acid fermentation mash fluid.

In FIG. 1, the meanings of the numerical figures are as follows:

1—fermentation tank, 2—starting mash, 3—gas phase part, 4—recycling pipe, 5—temperature regulating apparatus, 6—gas circulating apparatus, 7—plate fin foil, 8—oxygen supplying pipe, 9—control valve, 10—oxygen bomb, 11—oxygen concentration detector element, 12—oxygen partial pressure controlling device, 13—pressure control valve, 14—temperature sensing element.

It is an object of this invention to provide a process for producing vinegar by the stationary acetic acid fermentation characterized by using a closed type tank and keeping the oxygen concentration in the gas phase in the tank at a predetermined value.

It is another object of this invention to provide a process for producing vinegar by the stationary acetic acid fermentation and a system therefor characterized by using a closed type tank, keeping the oxygen concentration in the gas phase in the tank at a predetermined value and carrying out temperature control of said gas phase.

Other objects and advantages of this invention will become apparent from the description given below.

According to this invention, there are provided the following process and system:

(1) In the production of vinegar by stationary acetic acid fermentation, a process which comprises charging the starting mash into a closed type of fermentation tank, measuring the oxygen concentration in the gas phase in said fermentation tank and keeping the oxygen concentration in the gas phase so as to fall in the range of 20-60% (V/V) by supplying oxygen when the oxygen concentration has descreased;

(2) In the production of vinegar by stationary acetic acid fermentation, a process which comprises charging the starting mash into a closed type of fermentation tank, measuring the oxygen concentration in the gas phase in said fermentation tank, keeping the oxygen concentration in the gas phase so as to fall in the range of 20-60% (V/V) by supplying oxygen when the oxygen concentration in the gas phase has decreased, and at the same time controlling the fermentation temperature by controlling the temperature of the gas phase in said tank;

(3) A system for producing vinegar by stationary acetic acid fermentation which comprises a closed type fermentation tank 1; a recycling pipe 4 communicating with at least two points in the gas phase part in said fermentation tank and having a temperature regulating apparatus 5 and a gas circulating apparatus 6; an oxygen supplying pipe 8 having an opening on the gas phase circulating route constructed from said fermentation tank 1 and said recycling pipe 4; and a pressure control valve 13 provided in said circulating route.

In the Examples, the system of this invention is illustrated with reference to the drawing attached and the process for producing vinegar by the use of said system is illustrated to explain this invention in more detail.

In FIG. 1 attached, 1 is a closed type fermentation tank and 2 is the mash (liquid phase) sealed into this tank. In the upper part of this tank is formed gas phase part 3, of which at least two points (in this example, two points at the two ends of the top wall of fermentation tank) communicate with one another through a recycling pipe 4 having a temperature regulating apparatus 5 and a gas circulating apparatus 6. A gas phase circulating route is constructed from said fermentation tank 1 and said recycling pipe 4. One end of oxygen supplying pipe 8 communicates with the inside of said gas phase circulating route and the other end of it communicates with an oxygen supplying source such as oxygen bomb 10 via a control valve 9 which is, for example, an electro-magnetic valve. An oxygen concentration detector element 11 is inserted into said gas phase circulating route, with which the oxygen concentration in said circulating route is measured. At the same time, said oxygen concentration detector element 11 sends its measurement signal to an oxygen partial pressure controlling device 12, in which said measurement signal is changed to a control signal for control valve 9. The control valve 9 for the oxygen supplying source is operated by said control signal so that the control valve 9 is automatically opened or closed via said oxygen partial pressure controlling device 12 when the concentration of oxygen in the circulating route has become lower or higher than a predetermined value and thereby the oxygen concentration in the gas phase is maintained at the predetermined value.

Valve 13 is a pressure control valve which is so constructed that a portion of gas in the gas phase can be discharged from said pressure control valve 13 when the gas pressure in the gas phase has become higher than a predetermined value (for example, ordinary pressure). Said pressure control valve may be a check valve or a slender communicating pipe inserted through the top wall of fermentation tank 1 as shown in FIG. 1. If necessary, it is also allowable to provide a gas guide plate 15 confronting the gas discharging hole of recycling pipe 4 in order to prevent the pellicle of acetic acid bacteria from being injured.

Temperature sensing element 14 is a thermometer or the like which communicates with the temperature regulating apparatus 5 placed at the halfway position of recycling pipe 4 via a temperature controlling apparatus which is not shown in the figure, so as to always adjust the temperature of mash to a predetermined value.

This invention also contemplates the situation where the temperature of gas phase part is not directly controlled, i.e. a system in which the recycling pipe 4 and its annexed apparatuses are omitted from FIG. 1 and, in place of them, a spiral heat exchanger is set inside fermentation tank 1 or the outer wall of said tank 1 is cooled or warmed with cold water or hot water.

Next, the process of this invention will be further explained with reference to FIG. 1 attached.

A starting mash, previously heated to 28°-32° C., is charged into closed type fermentation tank 1. The surface of the mash is inoculated with a culture product obtained by the cultivation of acetic acid bacteria (acetic acid bacteria pellicle). The initiation of fermentation can be hastened by employing a large amount of the culture product. Then, oxygen gas is supplied into gas phase 3 from the oxygen supplying pipe via control valve 9. The oxygen concentration detector element 11 detects the oxygen concentration in gas phase 3. When the oxygen concentration has become higher or lower than the predetermined value, the oxygen partial pressure controlling device 12 works to control the opening of control valve 9, whereby the oxygen concentration in gas phase 3 is kept at the predetermined value. The charged mash meanwhile starts fermentation, with which the temperature of the mash gradually rises. When the mash temperature has exceeded 30° C., the gas circulating apparatus 6 is driven and the gas phase part in the tank is continuously sent to the temperature regulating apparatus 5 for the sake of heat removal, and the gas is again returned to fermentation tank 1, whereby the gas phase part is maintained in the neighborhood of the predetermined temperature. Alternatively, it is also possible to carry out the temperature regulation by passing cooling water through a spiral heat exchanger (not shown in the figure) provided just under the liquid surface in the tank without carrying out the above-mentioned circulation and cooling of the gas phase.

In this invention, the fermentation tank is a closed system, and the oxygen concentration in the gas phase is kept so as to fall in the range of 20-60% (V/V) by measuring the oxygen concentration of gas phase in the tank and supplying oxygen when the oxygen concentration has decreased. This is a very important point in this invention. An oxygen concentration higher or lower than the above-mentioned range is undesirable because under such a condition the production of acetic acid is slow and it is difficult to obtain a vinegar of high concentration in a short period of time. For a quick production of high concentration vinegar, it is particularly preferable to keep the oxygen concentration in the gas phase in the range of 35-45% (V/V).

As the oxygen to be supplied into gas phase in this invention, substantially pure oxygen gas and gases containing a high concentration of oxygen obtainable by mixing air or the like into pure oxygen can be referred to, among which substantially pure oxygen is particularly preferable for the reason mentioned below.

Thus, in the case of the latter gases containing high concentration of oxygen, the gases other than oxygen (for example, nitrogen gas) are not utilized in the process of fermentation and remain in the gas phase. Therefore, if the oxygen concentration in the gas phase is to be maintained at a high concentration, the nitrogen gas must be discharged out of fermentation tank through pressure control valve 13. However, it is almost impossible to separate the nitrogen gas and oxygen gas from the gas phase and discharge only the nitrogen gas out of the tank through the pressure control valve. Thus, in order to maintain the oxygen concentration in the gas phase at a high level for a long period of time, a tremendous amount of waste gas must be discharged which has a risk of losing useful ingredients in the mash. In the case of pure oxygen gas, on the contrary, the majority is utilized for the acetic acid fermentation and gases other than oxygen scarcely remain in the gas phase, so that the leakage of gas phase into the outer atmosphere is slight and the acetic acid fermentation can be effected with a high efficiency.

The starting mash and acetic acid bacteria used in the process of this invention are not particularly limited and anything may be used so far as they are used in the usual production of vinegar. Examples of the preferable starting mash include those prepared by using, as a main raw material, an ethyl alcohol-containing fluid obtainable by the alcoholic fermentation of a saccharified fluid of the starch of cereals such as rice, wheat, corn, kaoliang or the like, SAKE lees or an ethyl alcohol-containing liquors such as Japanese SAKE, synthetic SAKE, sweet SAKE, Japanese distilled drink, wine, whisky, brandy or the like and adding thereto a small quantity of acetic acid or vinegar (they are sometimes called "seed vinegar") so that the ethyl alcohol concentration of the resulting mixture comes to 4-10% (V/V) and its acidity comes to 1-4% (W/V).

As said acetic acid bacteria, anything may be used so far as they are bacteria belonging to Genus Acetobacter and having an ability to oxidize ethanol and to produce acetic acid. Examples of said bacteria include *Acetobacter aceti, A. pasteurianus, A. peroxydans*, and the like.

The shape of the fermentation tank may be any of box form and cylindrical form.

The volume of starting mash charged may be large or small. When the fermentation is to be completed in a short period of time, the starting mash should be charged to a shallow depth. When a fermentation tank of this invention is used, it is also allowable to charge the starting mash up to a height of 10 cm from the upper end of the vessel.

Though the optimum temperature of the fermentation varies depending upon bacterial strain, the fermentation temperature is usually regulated so that the surface layer temperature of mash becomes 28°-32° C. and preferably 29°-31° C.

Though the time period of fermentation varies depending upon the surface area of mash in the fermentation tank and the depth of liquid phase, it is, for example, about 5-6 days when surface area of mash is 100 cm$^2$ and depth of liquid phase is 14 cm.

After completion of the fermentation, the mash is transferred into a storage tank and aged there for a predetermined period of time, after which it is filtered and sterilized with heat at a temperature of 70° C. or above to give a product.

As is apparent from the description given above, this invention consists in that, in a closed type fermentation tank, the oxygen concentration of the gas phase in said fermentation tank is measured and oxygen is supplied when the oxygen concentration has decreased to keep the oxygen concentration of the gas phase so as to fall in the range of 20-60% (V/V). Thus, the acetic acid fermentation progresses quite actively and is completed in a short period of time so that the production period of vinegar can be shortened to a great extent and the vaporization loss of ethyl alcohol (as the starting material component), acetic acid (as the resulting component), water and the like occurring in the process of fermentation can be prevented almost perfectly. Therefore, a vinegar of high concentration can be produced rapidly, in high yield, sanitarily under scarce influence of miscellaneous bacteria or harmful organisms in the process of production, and in a good working environment, which is the merit of this invention.

When the oxygen concentration of the gas phase in the fermentation tank is kept so as to fall in a range 20-60% (V/V) and at the same time the gas is once taken out of the gas phase for the sake of temperature regulation and then it is again returned to the gas phase, there arises the following merit in addition to the above-mentioned merit.

Thus, the great quantity of fermentation heat generated in the surface layer part of the mash with progress of fermentation can be removed quite effectively and only the surface layer part of the mash can be warmed quite effectively, so that it is unnecessary to place an apparatus for letting cold or hot water flow down the outer wall of the tank, to provide a jacket capable of passing hot or cold water around the outer wall, or to set a spiral heat exchanger inside the fermentation tank. Thus, the structure of the fermentation tank can be much simplified. Further, since the material to be heated or cooled is not the whole body of mash but only its surface layer part, the development of hot brew odor in the vinegar or coloration of vinegar can be prevented and a vinegar quite excellent in quality can be obtained. Further, since the condensate formed upon the heat removal of gas phase can be recycled into the mash in the fermentation tank, the yield increases to a marked extent.

The invention will be explained in more detail with reference to examples, but the invention is not limited by these examples.

EXAMPLE 1

A wide mouth bottle having a bottom diameter of 11.7 cm, a height of 20.0 cm and a capacity of 2 liters was used as fermentation tank 1; an RA oxygen meter for use in both gas and liquid manufactured by Oriental Denki K.K. was used as an oxygen concentration detector element 11; Yamatake Honeywell Controller, 0-100% type, was used as an oxygen partial pressure controlling device 12; a Dimroth cooler was used as a temperature regulating apparatus 5; a small-sized air pump was used as a gas circulating apparatus 6; and they were set as shown in FIG. 1. A starting mash for vinegar production (alcohol concentration 3.8%, initial acidity 1.1%) comprising SAKE, rice vinegar and water was charged into said wide mouth bottle 1 so that the depth of liquid phase became about 14 cm. After inoculating a small amount of Acetic acid bacterium "SAKUSANKIN 1 KIN" (Acetobacter sp. 1) sold by the Fermentation Research Institute, Agency of Industrial Science and Technology, Japan, to the liquid surface, the mouth was tightly closed with a rubber stopper. A fermentation was carried out while automatically opening or closing the control valve 9 by means of oxygen concentration detector element 11 and oxygen partial pressure controlling device 12 to keep the oxygen concentration in the gas phase at 20.9%, 40.0% or 60.0%. After the surface layer temperature of the mash has exceeded 30° C., the gas phase was continuously circulated by driving the gas circulating apparatus 6, passed through the heat exchanger part in the temperature regulating apparatus 5 for the sake of heat removal and then returned to fermentation tank 1 to regulate the surface layer temperature of the mash so as to fall in the range of 29°-31° C. For comparison, the same starting mash as above was charged into the same fermentation tank 1 as above so that the depth of liquid phase became about 14 cm, a small amount of acetic acid bacterial pellicle ["SAKUSANKIN 1 KIN" (Acetobacter sp. 1)] was inoculated onto the liquid surface, and then an acetic acid fermentation was carried out at a mash temperature of 30° C. in an open state. The day-by-day changes in the acidities of the mash fluids were investigated to obtain the results shown in FIG. 2.

It is apparent from the results of FIG. 2 that a high concentration vinegar having an acidity of about 5.8-6.2 can be obtained in the closed gas phase state having an oxygen concentration of 20-60% of this invention and particularly the high concentration vinegar can be obtained in the shortest period of time in the gas phase state having an oxygen concentration of about 40%, whereas in the open state the vinegar obtained has an acidity of at most about 4.9%.

As used in this Example and the Examples mentioned below, the term "acidity" denotes a value which has been obtained by taking accurately 1 ml of mash fluid in a test tube, adding thereto 2 drops of 1% alcoholic solution of phenolphthalein, titrating it with 0.05N sodium hydroxide till the color changes and multiplying the titer (ml) with 0.3, which has a unit of acidity % (W/V). Substantially, it means acetic acid.

EXAMPLE 2

A closed type fermentation tank having a longitudinal length of 200 cm, a width of 88 cm, a height of 60 cm and a volume of 1 m$^3$ was used as fermentation tank 1; an RA type oxygen meter for use in both gas and liquid manufactured by Oriental Denki K.K. was used as an oxygen concentration detector element 11; Yamatake Honeywell Controller of 0-100% type was used as an oxygen partial pressure controlling device 12; an heat exchanger having a plate fin coil capable of passing hot or cold water in its inside was used as a temperature regulating apparatus 5; a blower was used as a gas circulating apparatus 6; an electro-magnetic valve was used as control valve 9; and they were set as shown in FIG. 1.

In the system mentioned above, a starting mash comprising 273 liters of SAKE (ethyl alcohol content 12.7%), 90 kg of vinegar (acidity 10%) and 540 liters of water (alcohol concentration of the mash: 3.9%; its acidity: 1.2%) was charged so as to give a liquid depth of about 50 cm and a small amount of acetic acid bacteria pellicle was innoculated to the mash. A fermentation was carried out while keeping the oxygen concentration in the gas phase at 40% during 10 days from the charge day and at 20% on and after the 11th day, by introducing oxygen. After the surface layer temperature of the mash has exceeded 30° C., the gas circulating apparatus 6 was driven and the gas phase was continuously passed through the plate fin coil in the temperature regulating apparatus 5 for the sake of heat removal and then returned into fermentation tank 1, in order to remove the fermentation heat generated in the surface layer part of the mash.

As Comparative Example 1, a starting mash (alcohol content 5%, acidity 1.2%) comprising 273 liters of SAKE (alcohol content 12.7%), 90 kg of vinegar (acidity 10%), 10.35 kg of pure alcohol and 540 liters of water was charged into the same system as in the preceding Example so that the depth of liquid phase became about 50 cm and a small amount of acetic acid bacteria pellicle was innoculated to the mash. A fermentation was carried out in the same manner as above, except that air was sent into the gas phase of the fermentation tank and the oxygen concentration of the gas phase was kept at 19-20%.

Further, as Comparative Example 2, a starting mash (alcohol concentration 5.0%, acidity 1.2%) comprising 350 liters of SAKE (alcohol content 12.7%), 90 kg of vinegar (acidity 10%) and 460 liters of water was charged into a usual open type fermentation tank having a longitudinal length of 200 cm, a width of 88 cm, a height of 60 cm and a volume of 1 m$^3$ so that the depth of liquid phase became 50 cm and a small amount of acetic acid bacteria pellicle was innoculated to the mash. A stationary fermentation was carried out at an outer atmospheric temperature of 27°-32° C.

In the above-mentioned three processes, the day number from the charge to the completion of fermentation, the acidity of mash fluid at the time of completing the fermentation, the temperature in the surface layer part (3 cm under the liquid surface) of mash and the yield of vinegar were investigated to obtain the results shown in Table 1.

TABLE 1

| Case | Characteristic features — Alcohol concentration in mash (%) | Characteristic features — Mode of fermentation | Period required for completing fermentation (day) | Acidity of mash fluid at completion of fermentation (%) | Temperature in surface layer part of mash (°C.) | Yield of vinegar (%) |
|---|---|---|---|---|---|---|
| This invention | 3.9 | Closed system with oxygen supply | 17 | 6.2 | 29-32 | 98 |
| Comparative Example 1 | 5.0 | Closed system with air supply | 30 | 6.2 | 29-32 | 80 |

TABLE 1-continued

| Case | Characteristic features | | Period required for completing fermentation (day) | Acidity of mash fluid at completion of fermentation (%) | Temperature in surface layer part of mash (°C.) | Yield of vinegar (%) |
|---|---|---|---|---|---|---|
| | Alcohol concentration in mash (%) | Mode of fermentation | | | | |
| Comparative Example 2 | 5.0 | Open system | 28 | 5.2 | 30–37 | 65 |

The results of Table 1 reveal the following. In the process of Comparative Example 1 where air is supplied into a closed system, the alcohol concentration in the initially charged mash is made as high as 5% as compared with other cases with consideration of the greater vaporization loss of the alcohol component from the mash, so that a high concentration of vinegar can be obtained at the time of completing the fermentation. However, this process has a fault that the yield of acetic acid is as low as 80% of the theoretical value and the time period necessary for completing the fermentation is as long as 30 days. On the other hand, in the process of Comparative Example 2 where the fermentation is carried out in an open system, the acidity of mash fluid at the time of completing the fermentation is as low as 5.2% in spite of the high initial alcohol concentration, so that a high concentration vinegar cannot be obtained. In addition, the yield of acetic acid is as low as 65% of the theoretical value, the time period necessary for completing the fermentation is as long as 28 days and the temperature of mash rises with progress of the fermentation up to an abnormal value of 37° C. On the contrary, in the process of this invention, the days elapsed from the charge to the completion of fermentation is 17 days which is 11–13 days shorter than the period in the other two processes. At the time of completing the fermentation, a high concentration of vinegar having an acidity of 6.2% can be obtained. The surface layer temperature of the mash is controlled in the quite desirable range of 29°–32° C., and the yield of the acetic acid can be as high as 98% of the theoretical value.

EXAMPLE 3

A system having the same structure as in Example 1 was used, except that the fermentation tank 1 was replaced with a closed type fermentation tank having a longitudinal length of 36 cm, a width of 20 cm and a height of 30 cm and the temperature regulating apparatus was replaced with a somewhat large-sized Dimroth condenser. A starting mash (ethyl alcohol content 4%, acidity 1%) comprising SAKE, seed vinegar and water was charged into the fermentation tank 1 of this Example so that the depth of liquid phase became 25 cm (the charged volume was about 18 liters), to which a small amount of acetic acid bacteria pellicle was inoculated. A fermentation was carried out while keeping the oxygen concentration of gas phase at 21%. In order to keep the surface layer temperature of mash at 29°–31° C. throughout the fermentation, after the temperature of the mash has exceeded 30° C., the gas circulating apparatus 6 was driven to continuously passing the gas phase through the heat exchanger part of the temperature regulating apparatus 5 for the sake of heat removal and then to return it into fermentation tank 1, whereby the surface layer temperature of the mash could be controlled in the range of 29°–31° C. For comparison, the same starting mash as above was charged into a fermentation tank 1 having a longitudinal length of 20 cm, a width of 35 cm and a height of 30 cm so that the depth of liquid phase became 21 cm (the charged volume was about 15 liters), to which a small amount of acetic acid bacteria pellicle was inoculated. A fermentation was carried out while allowing the mixture to stand in an open state at the room temperature of 29°–31° C. The quantities of ethyl alcohol and water lost by vaporization were measured everyday, which were compensated by gently introducing the quantities just equal to their losses through a slender tube into the bottom of the mash (the compensation of ethyl alcohol amounted to 608 g). The day-by-day change of the acidity of mash fluid and the day-by-day formation of acetic acid per unit bacteria pellicle area of the mash surface were investigated to obtain the results shown in FIG. 3.

The results of FIG. 3 demonstrate that, in the comparative example, the rise in acidity was so slow that a long period of about 20 days was necessary for completing the fermentation and the yield of acetic acid from the used ethyl alcohol was 52% of the theoretical value which means that the yield from starting material was very low. On the contrary, according to the process of this invention, the rise in acidity was remarkably rapid and the formation of acetic acid per unit area of bacteria pellicle reached maximum in several days after charge and reached nearly zero on the 10th day, so that the time period necessary for completing the fermentation could be as short as ½ of that in the comparative example or could be shortened by about 10 days. Further, the yield of acetic acid based on the used ethyl alcohol was 98% of the theoretical value which means that the yield from starting material was very high.

EXAMPLE 4

In FIG. 1, the recycling pipe 4 having a temperature regulating apparatus 5 and a gas circulating apparatus 6 was not used and, in place of them, a spiral heat exchanger was set just under the liquid surface of fermentation tank 1 so that the heat exchanger could pass heating water or cooling water. A wide mouth bottle having a bottom diameter of 11.7 cm, a height of 20.0 cm and a capacity of 2 liters was used as fermentation tank 1; an RA oxygen meter for use in both gas and liquid manufactured by Oriental Denki K.K. was used as oxygen concentration detector element 11; and Yamatake Honeywell Controller of 0–100% type was used as an oxygen partial pressure controlling device 12. 1.5 l of a starting mash (ethyl alcohol concentration 3.8%, initial acidity 1.1%) for the production of vinegar, comprising SAKE, rice vinegar and water, was charged into the wide mouth bottle so that the depth of liquid phase became about 14 cm, on the liquid surface of which was transplanted a small amount of Acetic acid bacterium "SAKUSANKIN 1 KIN" (Acetobacter sp. 1) sold by the Fermentation Research Institute, Agency of Industrial Science and Technology, Japan. Then, the mouth of the bottle was tightly closed with a rubber stopper, and a fermentation was carried out while keeping the oxygen concentration in gas phase at 40.0% by automatically opening or closing the control valve 9 by means of oxygen concentration detector element 11 and oxygen partial pressure controlling device 12 and while controlling the surface layer temperature of the mash in the range of 29°–31° C. by passing colling water through the spiral part (heat exchanger part) of the spiral heat exchanger when the surface layer temperature of the mash had exceeded 30° C. As the result, a high concentration vinegar having an acidity of 6.0% was obtained in 6 days. The yield of acetic acid from alcohol was 98% of the theoretical value.

What is claimed is:

1. A stationary acetic acid fermentation process for the production of vinegar comprising charging a starting mash into a closed type fermentation tank and fermenting said mash as a stationary culture with acetic acid bacteria at an effective temperature to produce a high yield of vinegar, said fermentation carried out while maintaining the oxygen concentration and the gas phase of said fermentation tank in the range of 20–60% (V/V) by supplying sufficient gas containing a high concentration of oxygen into the upper space of said fermentation tank, said gas selected from the group consisting of pure oxygen and pure oxygen mixed with air.

2. A stationary acetic acid fermentation process for the production of vinegar comprising charging a starting mash into a closed type fermentation tank, fermenting said mash as a stationary culture with acetic acid bacteria at an effective temperature to produce a high yield of vinegar, said fermentation carried out while maintaining the oxygen concentration in the gas phase of said fermentation tank in the range of 20–60% (V/V) and regulating said temperature by circulating said gas phase through a heat exchanger outside of said fermentation tank.

3. A process according to claim 1 or 2, wherein said oxygen concentration is 35–45% (V/V).

4. A process according to claim 1 or 2, wherein the temperature of the upper layer of the mash is 28°–32° C.

* * * * *